US006843151B2

(12) United States Patent
Ma et al.

(10) Patent No.: US 6,843,151 B2
(45) Date of Patent: Jan. 18, 2005

(54) TRANSMISSION MECHANISM WITH A SINGLE DIFFERENTIAL MECHANISM

(75) Inventors: Weijin Ma, Xinjiang (CN); Mingxue Yang, Xinjiang (CN); Yujiang Wang, Xinjiang (CN); Yingpu Wang, Xinjiang (CN); Bin Liang, Xinjiang (CN); Yongge Fan, Xinjiang (CN); Wenbin Pan, Xinjiang (CN); Feng Gao, Beijing (CN)

(73) Assignee: Xinjiang Sheng Sheng Co., Ltd. (CN)

( * ) Notice: Subject to any disclaimer, the term of this patent is extended or adjusted under 35 U.S.C. 154(b) by 0 days.

(21) Appl. No.: 10/661,469

(22) Filed: Sep. 11, 2003

(65) Prior Publication Data

US 2004/0118242 A1 Jun. 24, 2004

(30) Foreign Application Priority Data

Sep. 12, 2002 (CN) ..................................... 02253904 U

(51) Int. Cl.[7] .............................................. F16H 48/06
(52) U.S. Cl. .......................... 74/640; 475/203; 475/206; 475/230
(58) Field of Search ........... 74/640, 650; 475/200–201, 475/203, 206, 230

(56) References Cited

U.S. PATENT DOCUMENTS

| 1,362,490 | A | * | 12/1920 | Keck ............................ 74/329 |
| 2,306,545 | A | * | 12/1942 | Kummich .................... 475/203 |
| 2,454,685 | A | * | 11/1948 | Avila ............................ 475/203 |
| 3,309,943 | A | * | 3/1967 | Kosman et al. ............. 475/200 |
| 4,611,504 | A | * | 9/1986 | Rundle ........................ 475/198 |
| 4,662,241 | A | * | 5/1987 | Edwards ...................... 475/206 |
| 4,713,983 | A | * | 12/1987 | Rundle ........................ 475/206 |
| 4,966,574 | A | * | 10/1990 | von Kaler et al. .......... 475/206 |
| 5,041,067 | A | * | 8/1991 | Hauser ........................ 475/211 |
| 6,694,835 | B2 | * | 2/2004 | Kawahara .................... 74/355 |
| 2004/0050196 | A1 | * | 3/2004 | Ma et al. ....................... 74/344 |
| 2004/0087406 | A1 | * | 5/2004 | Ma et al. .................... 475/209 |
| 2004/0092354 | A1 | * | 5/2004 | Ma et al. .................... 475/200 |
| 2004/0124025 | A1 | * | 7/2004 | Ma et al. .................... 180/248 |

* cited by examiner

Primary Examiner—Tisha Lewis
(74) Attorney, Agent, or Firm—Sheridan Ross P.C.

(57) ABSTRACT

The present invention provides a transmission mechanism with a single differential mechanism for an automotive vehicle. The transmission mechanism of the present invention is of a compact structure and a relatively less cost of manufacturing, and makes a clearance between the chassis of the automotive vehicle and the ground increased. The performance of the automotive vehicle equipped with the transmission mechanism of the invention can be improved.

20 Claims, 3 Drawing Sheets

TRANSMISSION MECHANISM WITH A SINGLE DIFFERENTIAL MECHANISM

BACKGROUND OF THE INVENTION

1. Field of the Invention

The present invention relates to a transmission mechanism of automotive vehicles, and more particularly to a transmission mechanism with a single differential mechanism.

2. Description of the Related Art

Many transmission mechanisms with a differential gear lock limiting mechanism have been used in automotive vehicles. Because when an automotive vehicle encounters weaker roads, such as loose soil, foothill and the like, two wheels of the automotive vehicle at the same side may lose adhesions to the ground, which will cause the wheels skidding. The differential gear lock limiting mechanism can limit different rotating speeds of the two wheels up to locking the differential gear of the automotive vehicle. In this case, the driving side shafts of the two sides will be integrated, and the automotive vehicle can only be driven in line. Moreover, the differential gear lock limiting mechanism used in the art is complicated, expensive and difficult to maintain.

Hence, a transmission mechanism that overcomes the above-mentioned problems is desired.

SUMMARY OF THE INVENTION

Accordingly, an object of the present invention is to provide a transmission mechanism that overcomes the shortcomings in the prior art.

In order to achieve the above-mentioned object, a transmission mechanism for an automotive vehicle of the present invention comprises a drive housing having a first bearing bracket disposed at the upper portion thereof, a second bearing bracket disposed at the left lower portion thereof and a third bearing bracket disposed at the right lower portion thereof; a differential mechanism and including a right side bevel gear, a left side bevel gear and a ring gear; a core shaft disposed at the lower portion of the drive housing, on which the differential mechanism is mounted; a driving power input shaft mounted within the first bearing bracket of the drive housing; a sliding gear slidably fixed on the driving power input shaft; a first dual tandem gear mounted on the driving power input shaft; a rear right wheel output shaft mounted within the second bearing bracket; a second dual tandem gear mounted on the rear right wheel output shaft and engaged to the first sliding gear and the first dual tandem gear; a fifth gear mounted on the rear right wheel output shaft and engaged to the first dual tandem gear and the ring gear; a sixth gear fixed on the rear right wheel output shaft; a seventh gear mounted on the core shaft and meshing with the sixth gear; a shaft sleeve fixed to the left side bevel gear and mounted on the core shaft; an eighth gear mounted on the shaft sleeve; a rear left wheel output shaft mounted within the third bearing bracket; a ninth gear fixed on the rear left wheel output shaft and meshing with the eighth gear; a front left wheel output shaft engaged with the shaft sleeve; a front right wheel output shaft engaged with the core shaft; and when the driving power input shaft is driven, the sliding gear can be regulated to mesh with either the first dual tandem gear or the second dual tandem gear, so that the automotive vehicle can obtain different speeds, and wheels at the same side can be driven at the same time.

In an embodiment of the invention, the front left wheel output shaft is connected to the shaft sleeve with a slidable engaging member, and the core shaft is connected to the front right wheel output shaft with an engaging member disposed between a smaller portion of the core shaft extended from a larger portion and the front right wheel output shaft.

In another embodiment of the invention, the first dual tandem gear includes an inner gear disposed within a first larger gear thereof to mesh with the first sliding gear.

In a further embodiment of the invention, the second dual tandem gear includes a second larger gear and a second smaller gear to respectively mesh with a first smaller gear and the first larger gear of the first dual tandem gear.

In the invention, the sliding gear may be splined to the driving power input shaft, and each of the sliding gear and the slidable engaging member can provide a recess at the outer surface thereof for connecting a fork for the control.

Compared to the prior art, a single differential mechanism is used in the transmission mechanism of the present invention to drive four wheels. Therefore, the transmission mechanism is of a compact structure and a relatively less cost of manufacturing, and makes a clearance between the chassis of the automotive vehicle and the ground increased. As a result, the performance of the automotive vehicle is improved and the automotive vehicle can be steered smoothly. Furthermore, the single differential mechanism makes it possible to produce different speeds between the left side wheels and the right side wheels. Thus, the single differential mechanism can obtain the same performance as those with two differential mechanisms in the prior art.

Other objects, features and advantages of the present invention will become apparent from the following detailed description in conjunction with the accompanying drawings.

DETAILED DESCRIPTION OF PREFERRED EMBODIMENTS OF THE INVENTION

The present invention will be further described below with reference to the drawings.

Figure 1:
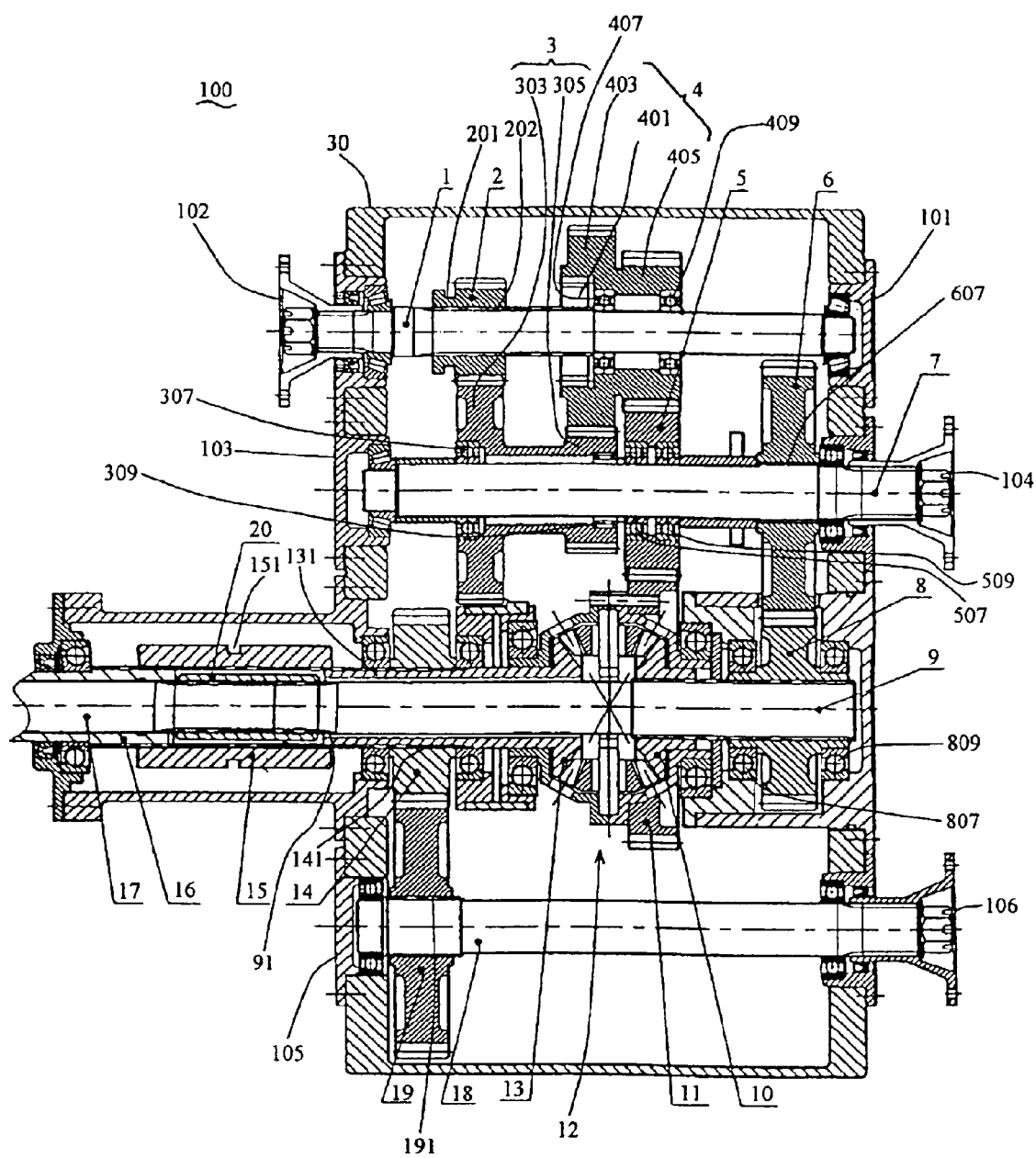
FIG. 1 is a schematic plan view of a transmission mechanism in accordance with the present invention.
Figure 2:
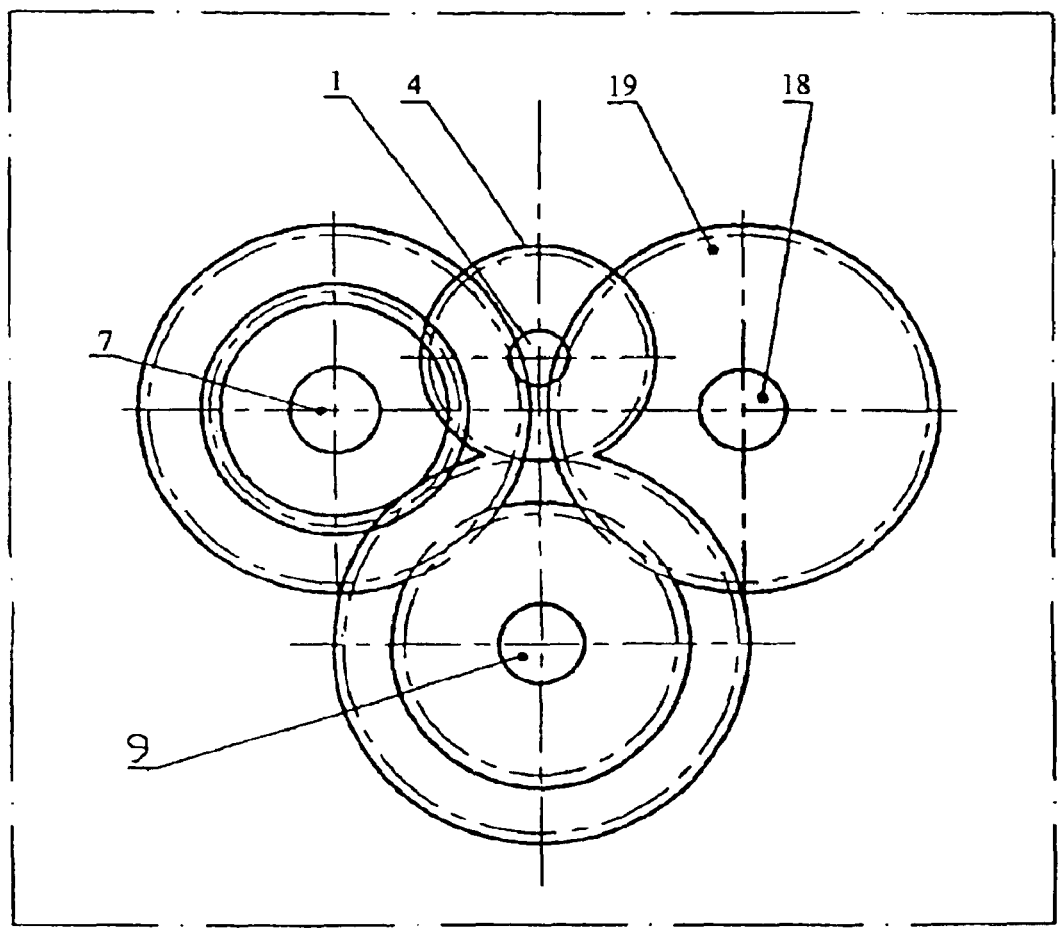
FIG. 2 is a schematic and sketching side view showing the location of shafts of the transmission mechanism as shown in FIG. 1.
Figure 3:
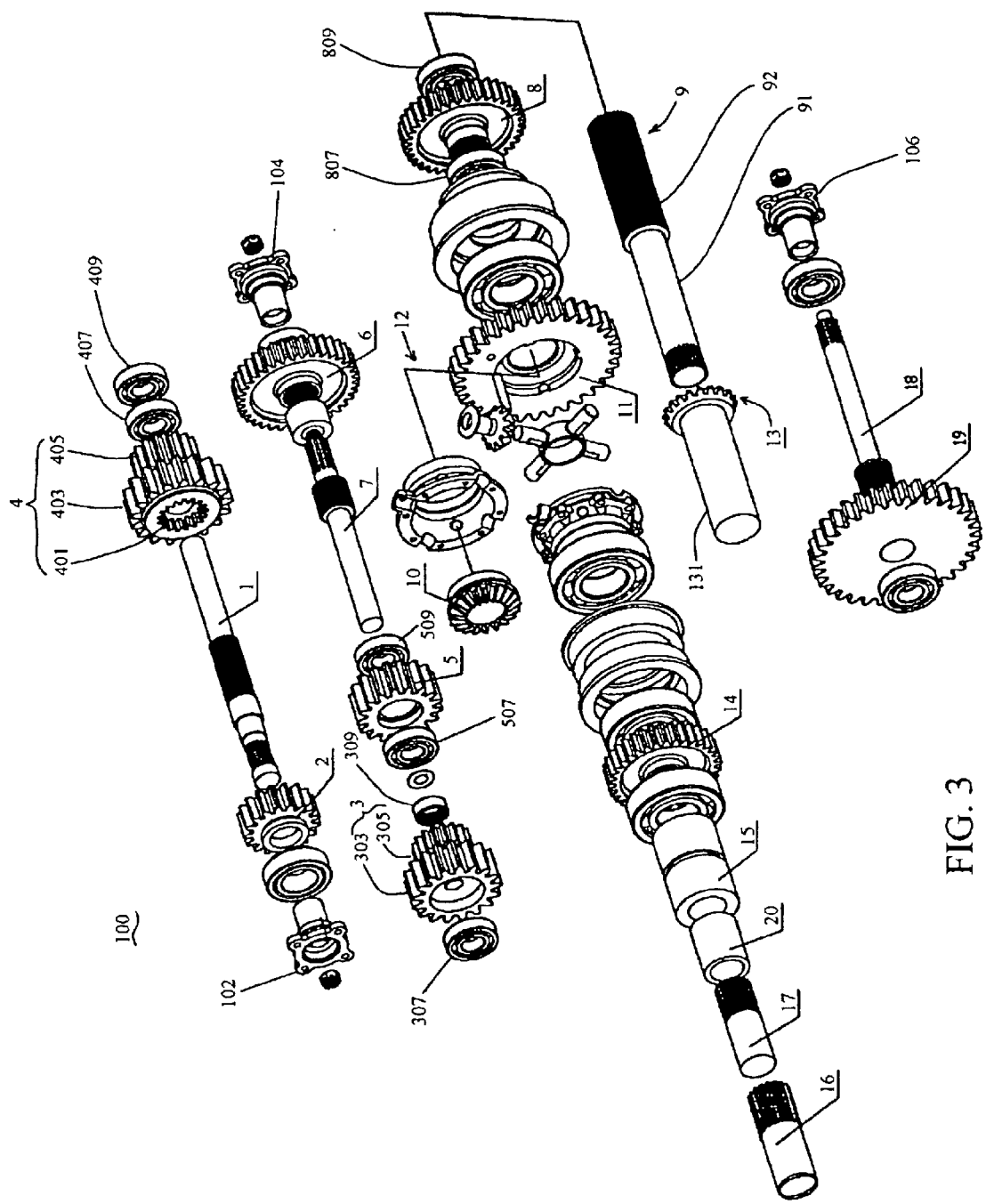
FIG. 3 is a schematically exploded view of a transmission mechanism in accordance with the present invention as shown in FIG. 1.

Referring to FIGS. 1 to 3, a transmission mechanism 100 of an automotive vehicle in accordance with the present invention comprises a drive housing 30, a driving power input shaft 1, a rear right wheel output shaft 7, a core shaft 9, a front left wheel output shaft 16, a front right wheel output shaft 17, a rear left wheel output shaft 18, and a differential mechanism 12 mounted at the lower portion of the drive housing 30 and including a right side bevel gear 10, a left side bevel gear 13 and a ring gear 11. The drive housing 30 has a first bearing bracket 101 disposed at the upper portion thereof, a second bearing bracket 103 disposed at the left lower portion thereof and a third bearing bracket 105 disposed at the right lower portion thereof.

The driving power input shaft 1 is connected with an engine (not shown) of the automotive vehicle via a first connecting member 102 and mounted within the first bearing bracket 101. A sliding gear 2 is splined to the driving power input shaft 1 via a first spline 202 and can move along the input shaft 1. A first dual tandem gear 4 having a first larger gear 403 and a first smaller gear 405, is mounted on the input shaft 1 via two ball bearings 407, 409, and provides an inner gear 401 extended inward from a side surface of the first larger gear 403 to mesh with the sliding gear 2.

The rear right wheel output shaft 7 is connected with a rear right wheel (not shown) of the automotive vehicle via a second connecting member 104 and mounted within the second bearing bracket 103. On is mounted a second dual tandem gear 3 including a second larger gear 303 and a second smaller gear 305 via a ball bearing 307, a roller bearing 309, respectively. A fifth gear 5 and a sixth gear 6 are mounted on the rear right wheel output shaft 7 via two ball bearings 507, 509 and a second spline 607, respectively. The second larger gear 303 and the second smaller gear 305 mesh with the sliding gear 2 and the first larger gear 403, respectively. The first smaller gear 405 meshes with the fifth gear 5.

Elements of the differential mechanism 12 in this invention are the same as those in the prior art except those specifically described herein. Besides the right side bevel gear 10, a seventh gear 8 is mounted on the core shaft 9 via ball bearings 807, 809 to mesh with the sixth gear 6. The core shaft 9 has two portions, a smaller portion 91 and a larger portion 92. The left side bevel gear 13 is fixed to a shaft sleeve 131 to receive the smaller portion 91 of the core shaft 9.

The front right wheel output shaft 17 is connected with a front right wheel (not shown) of the automotive vehicle, and coaxially connected via an engaging member 20 to the smaller portion 91. A slidable engaging member 15 is provided to connect the front left wheel output shaft 16 with the shaft sleeve 131. An eighth gear 14 is splined to the shaft sleeve 131 of the left side bevel gear 13 via a third spline 141.

The rear left wheel output shaft 18 connected with a rear left wheel (not shown) of the automotive vehicle via a third connecting member 106 is mounted within the third bearing bracket 105. A ninth gear 19 is splined to the rear left wheel output shaft 18 via a fourth spline 191 to mesh with the eighth gear 14.

Recesses 201 and 151 are provided at the outer surface of the sliding gear 2 and the slidable engaging member 15, respectively, to accommodate forks (not shown) that extend out of the drive housing 30.

The operation of the transmission mechanism 100 of the present invention will now be described as follows. The driving power is transmitted to the sliding gear 2 through the driving power input shaft 1 and the corresponding splines. When the sliding gear 2 slides, it can be regulated to mesh with either the second dual tandem gear 3 or the first dual tandem gear 4 to make the vehicle 12 obtain different speeds. For example, the driving power through the first dual tandem gear 4 is transmitted to the ring gear 11 of the differential mechanism 12 and drives the differential mechanism 12 to rotate. A part of the driving power through the differential mechanism 12 is transmitted to the core shaft 9, the seventh gear 8 and the sixth gear 6 in turn via the right side bevel gear 10. The sixth gear 6 drives the rear right wheel output shaft 7 that is connected with the corresponding rear right wheel (not shown). Meanwhile, a part of the driving power through the core shaft 9 is transmitted by the engaging member 20 to the front right wheel output shaft 17 that is connected with the corresponding front right wheel (not shown). Another part of the driving power through the differential mechanism 12 is transmitted to the left side bevel gear 13 and divided two subparts. A subpart of the driving power is transmitted to the front left wheel output shaft 16 via the slidable engaging member 15, and another subpart of the driving power is transmitted to the rear left wheel output shaft 18 via the eighth gear 14 and the ninth gear 19. That is to say, the two front output shafts 16, 17 are driven by the engaging members 15, 20, respectively, and the two rear output shafts 7, 18 are driven in parallel. With the transmission mechanism 12 of the present invention, the wheels at the same side can be driven at the same time.

When an automotive vehicle equipped the transmission mechanism of the invention moves on weaker roads such as a road with loose soil, mud and ice, even though a wheel skids and loses the adhesion to the ground, the output power of the engine will not decrease because the skidding wheel doesn't rotate. On the other hand, another unskidding wheel of the same side can still be driven because the two wheels are controlled by a common side bevel gear. In addition, because other two wheels at the other side are controlled by another side bevel gear, the vehicle can run as normally. As a result, when two wheels at the same side skid, the vehicle can move via other two unskidding wheels at the same side, and when two wheels at the different sides skid, the automotive vehicle can move via other two unskidding wheels at the different sides.

It is understood that the particular structures embodying the present invention shown and described above are only used for illustrating the present invention, and are not intended to limit the invention. Any modifications or variations to the present invention without departing from the spirit of the invention shall be fallen into the scope of the invention defined by the appended claims.

What is claimed is:

1. A transmission mechanism for an automotive vehicle comprising a drive housing having a first bearing bracket disposed at the upper portion thereof, a second bearing bracket disposed at the left lower portion thereof and a third bearing bracket disposed at the right lower portion thereof;

a differential mechanism including a right side bevel gear, a left side bevel gear and a ring gear;

a core shaft disposed at the lower portion of said drive housing, on which said differential mechanism is mounted;

a driving power input shaft mounted within said first bearing bracket of said drive housing;

a sliding gear slidably disposed on said driving power input shaft;

a first dual tandem gear mounted on said driving power input shaft;

a rear right wheel output shaft mounted within said second bearing bracket;

a second dual tandem gear mounted on said rear right wheel output shaft and engaged to said first sliding gear and said first dual tandem gear;

a fifth gear mounted on said rear right wheel output shaft and engaged to said first dual tandem gear and said ring gear;

a sixth gear fixed on said rear right wheel output shaft;

a seventh gear mounted on said core shaft and meshing with said sixth gear;

a shaft sleeve fixed to said left side bevel gear and mounted on said core shaft;

an eighth gear mounted on said shaft sleeve;

a rear left wheel output shaft mounted within said third bearing bracket;

a ninth gear fixed on said rear left wheel output shaft and meshing with said eighth gear;

a front left wheel output shaft engaged with said shaft sleeve; and a front right wheel output shaft engaged with said core shaft, wherein when said driving power input shaft is driven, said sliding gear can be regulated to mesh with either said first dual tandem gear or said second dual tandem gear so that the automotive vehicle can obtain different speeds, and wheels at the same side of the automotive vehicle can be driven at the same time.

2. The transmission mechanism of claim 1, wherein said front left wheel output shaft is connected to said shaft sleeve with a slidable engaging member, and said core shaft is connected to said front right wheel output shaft with an engaging member disposed between a smaller portion of said core shaft extended from a larger portion and said front right wheel output shaft.

3. The transmission mechanism of claim 1, wherein said first dual tandem gear includes an inner gear disposed within a first larger gear thereof to mesh with said first sliding gear.

4. The transmission mechanism of claim 2, wherein said first dual tandem gear includes an inner gear disposed within a first larger gear thereof to mesh with said first sliding gear.

5. The transmission mechanism of claim 3, wherein said second dual tandem gear includes a second larger gear and a second smaller gear to respectively mesh with a first smaller gear and said first larger gear of said first dual tandem gear.

6. The transmission mechanism of claim 4, wherein said second dual tandem gear includes a second larger gear and a second smaller gear to respectively mesh with a first smaller gear and said first larger gear of said first dual tandem gear.

7. The transmission mechanism of claim 3, wherein said sliding gear is splined to said driving power input shaft.

8. The transmission mechanism of claim 4, wherein said sliding gear is splined to said driving power input shaft.

9. The transmission mechanism of claim 5, wherein said sliding gear is splined to said driving power input shaft.

10. The transmission mechanism of claim 6, wherein said sliding gear is splined to said driving power input shaft.

11. The transmission mechanism of claim 1, wherein each of said sliding gear and said slidable engaging member provides a recess at the outer surface thereof for connecting a fork.

12. The transmission mechanism of claim 2, wherein each of said sliding gear and said slidable engaging member provides a recess at the outer surface thereof for connecting a fork.

13. The transmission mechanism of claim 3, wherein each of said sliding gear and said slidable engaging member provides a recess at the outer surface thereof for connecting a fork.

14. The transmission mechanism of claim 4, wherein each of said sliding gear and said slidable engaging member provides a recess at the outer surface thereof for connecting a fork.

15. The transmission mechanism of claim 5, wherein each of said sliding gear and said slidable engaging member provides a recess at the outer surface thereof for connecting a fork.

16. The transmission mechanism of claim 6, wherein each of said sliding gear and said slidable engaging member provides a recess at the outer surface thereof for connecting a fork.

17. The transmission mechanism of claim 7, wherein each of said sliding gear and said slidable engaging member provides a recess at the outer surface thereof for connecting a fork.

18. The transmission mechanism of claim 8, wherein each of said sliding gear and said slidable engaging member provides a recess at the outer surface thereof for connecting a fork.

19. The transmission mechanism of claim 9, wherein each of said sliding gear and said slidable engaging member provides a recess at the outer surface thereof for connecting a fork.

20. The transmission mechanism of claim 10, wherein each of said sliding gear and said slidable engaging member provides a recess at the outer surface thereof for connecting a fork.

* * * * *